United States Patent

[11] 3,610,738

[72] Inventor Carl E. Bochmann
     Columbus, Ind.
[21] Appl. No. 861,717
[22] Filed Sept. 29, 1969
[45] Patented Oct. 5, 1971
[73] Assignee Arvin Industries, Inc.
     Columbus, Ind.

[54] ADJUSTABLE MAGNIFYING MIRROR
     6 Claims, 4 Drawing Figs.
[52] U.S. Cl. ..................................................... 350/295,
                                                              350/296
[51] Int. Cl. ..................................................... G02b 5/10
[50] Field of Search ........................................... 350/295,
                                                 296, 180, 278, 312, 161

[56]               References Cited
              UNITED STATES PATENTS
2,952,189   9/1960   Pajes ............................. 350/295
3,198,070   8/1965   Platzer, Jr. et al. ............. 350/278 X
              FOREIGN PATENTS
  879,321   6/1953   Germany ....................... 350/295
1,143,034   4/1957   France .......................... 350/295

Primary Examiner—David Schonberg
Assistant Examiner—John W. Leonard
Attorney—Trask, Jenkins & Hanley ABSTRACT: A mirror formed by a circular-shaped sheet of flexible material, and having a reflective coating on one side, is held at its periphery in a resilient diaphragm which provides an air pocket between itself and the rear side of the mirror. The diaphragm and mirror assembly are mounted on a rigid dish-shaped plate, which is also circular shaped and attached at its periphery to the rear side of said diaphragm. A hole is provided at the center of the plate, and a stem attached to the center of the rear face of the diaphragm extends through the hole and has an eccentric cam pivotally mounted to its free end. The rear face of the plate serves as a cam following surface, and as the cam is turned the diaphragm is drawn rearwardly thereby decreasing the air pressure in the pocket between the diaphragm and mirror, and causing the flexible mirror to deflect in a concave manner. Such concave flexion of the mirror gives it a magnifying effect which may be increased or decreased with the positioning of the cam.

PATENTED OCT 5 1971 3,610,738

INVENTOR.
CARL E. BOCHMANN
BY
Trask, Jenkins & Hanley
ATTORNEYS

ADJUSTABLE MAGNIFYING MIRROR

BACKGROUND OF THE INVENTION

This invention is particularly adaptable for use as a vanity mirror. In the past, it has been common to combine magnifying and ordinary mirrors for use as vanity mirrors, and one popular device combines the two types of mirrors at opposite ends of a curved rod so that when one of the mirrors is being used, the other serves as a stand for the device. Thus, two separate mirrors are used and the user must lift the device and turn it over when switching from one type of mirror to the other. It is an object of the present invention to provide a mirror device having a single mirror surface which is adjustable between an ordinary mirror and a magnifying mirror.

SUMMARY OF THE INVENTION

In accordance with the invention I provide a mirror assembly having a flexible reflecting surface, and having means for adjusting the reflecting surface between limits which provide an ordinary mirror or a magnifying mirror. The reflector is a circular sheet of flexible plastic having a reflective coating on one side, and it is held in a frame formed by a flexible diaphragm. The diaphragm engages the periphery of the circular reflector and encloses the rear side thereof to provide an air pocket between the diaphragm and the reflector. A stem is fixedly attached to the rear side of the diaphragm and extends therefrom having an eccentric cam mounted rotatably to its free end. The stem projects through the center of a dish-shaped support member which forms a cam-following surface and which is attached at its circumference to the rear side of the diaphragm. The central section of the support member is formed to provide a space between itself and the rear side of the diaphragm so that said diaphragm may be deflected rearwardly upon operation of the cam. Thus, rotation of the cam pulls the central portion of the diaphragm toward the dish-shaped member, thereby creating a partial vacuum between the diaphragm and the reflector and causing the reflector to flex in a concave manner. The reflector is not sealed to the diaphragm, but is pulled into a sealing position against the diaphragm when rearward movement of the diaphragm is commenced.

BRIEF DESCRIPTION OF THE DRAWINGS

The accompanying drawings illustrate one embodiment of the invention. In such drawings.

DETAILED DESCRIPTION OF THE PREFERRED EMBODIMENT

Figure 1:
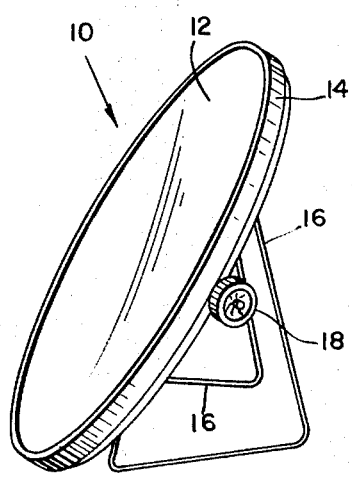
FIG. 1 is a perspective view of a vanity mirror embodying the invention.

A vanity mirror 10 is illustrated in FIG. 1 and comprises a reflector 12 mounted in a frame 14 which is supported in a usable position by a pair of wire legs 16. The assembly is provided with adjustment means for varying the shape of the reflector to provide a magnifying mirror, and said adjusting means is controlled by a knob 18 which is accessible from the side of the mirror assembly.

Figure 2:
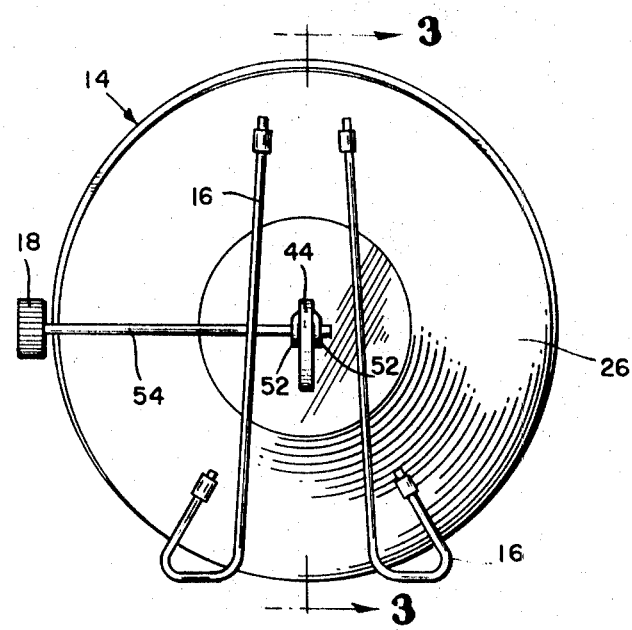
FIG. 2 is a rear view of the mirror shown in FIG. 1.
Figure 3:
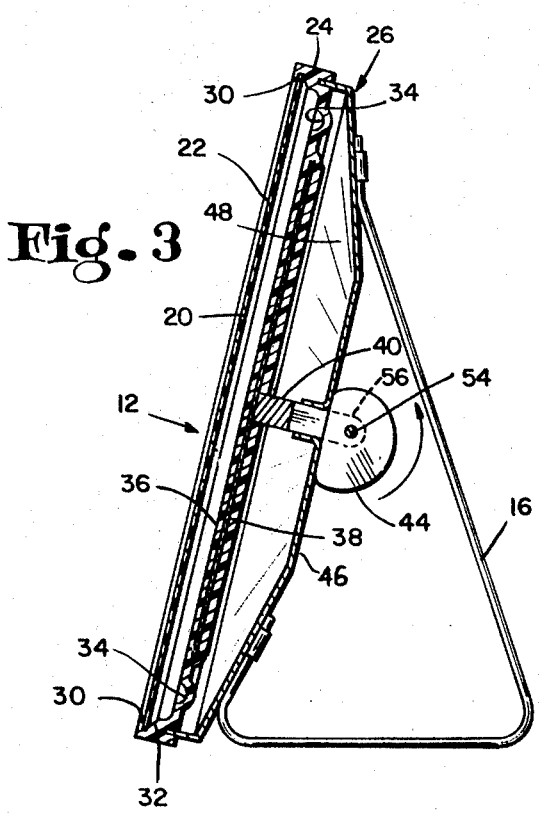
FIG. 3 is an enlarged sectional view taken along the line 3—3 of FIG. 2.
Figure 4:
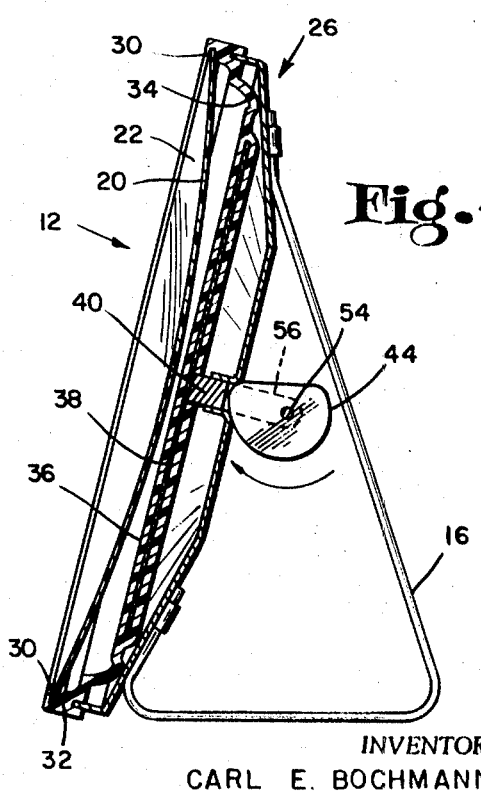
FIG. 4 is an enlarged sectional view taken along the line 3—3 of FIG. 2, with the mirror shown in an adjusted position wherein the device comprises a magnifying mirror.

The details of construction of the mirror assembly, including the structure of the adjusting means, is shown in FIGS. 2–4. The reflector 12 is formed by a thin circular sheet of flexible plastic 20 having a reflective coating 22 on one face thereof. The frame 14 which supports the reflector comprises a flexible diaphragm 24 and a rigid dish-shaped support member 26 attached thereto. The support 26 forms the main structural member of the assembly, and the wire legs 16 are attached to said support to hold the mirror in a semiupright position.

The diaphragm 24 is also a dish-shaped member having an inwardly directed lip 30 about its outer edge. The reflector is wedged between the lip 30 and a diagonal portion 32 of the diaphragm which extends inwardly and rearwardly from the lip 30. The diagonal portion 32 terminates at a circumferential grooved portion 34 of the diaphragm which permits the center of the diaphragm to be deflected axially with respect to the outer diagonal and lip portions thereof. The diagonal portion 32 projecting angularly rearwardly from the rear surface of the reflector 12 provides an air pocket between the central portion 36 of the diaphragm and the rear face of the reflector. The volume of this air pocket is varied as the diaphragm is deflected, as will be described hereinafter. The central diaphragm portion 36 is reinforced by a rigid circular plate 38 which is enclosed by said central portion. The plate 38 stiffens the central portion of the diaphragm so that the entire central portion can be moved in a single plane with respect to the outer portion defined by the grooved portion 34. A stem 40 extends through the rear portion of the diaphragm at the center thereof and is attached to the rigid plate 38; said stem extending rearwardly therefrom through an opening 42 in the center of the support 26 for connection to an eccentric cam 44.

The support member 26 is formed by a central flat section 46 having a transitional section 48 extending angularly outwardly and forwardly therefrom. A cylindrical rim 50 extends forwardly from the outer edge of the angular section 48 and is fixedly attached to the rear side of the diaphragm. The cylindrical portion 50 and angular portion 48 of the support extend away from the rearward side of the diaphragm to provide a space between the support and the diaphragm, thereby permitting the diaphragm to be deflected rearwardly toward the support.

The stem 40, which extends through the opening 42 at the center of the support, is provided with extensions 52 at its outer end. A cam 44 is carried between the extension and is fixedly mounted on a shaft 54 rotatably carried in said extension. The shaft 54 extends to one side of the frame 14 and has the knob 18 mounted thereon. The cam bears against the rearward face of the support, so that the support acts as a cam follower when said cam is rotated about its mounting on the stem 40. FIG. 3 shows the assembly in its normal position where the reflecting surface 22 is planar and provides a 1:1 magnification ratio.

In the operation of the device, as the knob and shaft 18 and 54 are rotated, the cam 44 is rotated about its mounting and causes the stem to be pulled rearwardly thereby deflecting the diaphragm rearwardly and increasing the volume of the air pocket between the reflector and the diaphragm. As such rearward deflection of the diaphragm commences, the periphery of the reflector is pulled against the diagonal portion of the diaphragm, thereby creating a seal between the reflector and the diaphragm and causing a decrease in air pressure as the volume between the two is increased by the rearwardly moving central portion of the diaphragm. The groove 34 provides sufficient flexibility between the central portion and the rim of the diaphragm to permit said central portion to move easily, while the stiffening plate 38 causes the entire central portion of the diaphragm to move as a unit thereby providing a large volume change for a small linear movement of the stem 40. As the pressure differential between the forward and rear faces of the reflector increases due to the vacuum created between the reflector and diaphragm, the reflecting surface 22 of the mirror will be moved into the concave shape shown in FIG. 4, thereby providing a magnification effect at said reflecting surface. The circular shape of the support 26, the circular central portion 36 of the diaphragm, and the circular reflector 12, provide a uniform deflection due to said pressure differential, and as shown in FIG. 4 the edge of the reflector remains relatively stationary as the central portion thereof is drawn inward. As will be understood, the amount of magnification provided will depend upon the degree of rearward flexing of the reflector which in turn is a function of the vacuum created by the amount of rearward movement of central diaphragm portion 36.

Conversely, rotation of the knob 18 to move the cam back into the position shown in FIG. 3 will decrease the volume of the air trapped between the reflector and diaphragm, thereby removing the pressure differential and allowing the reflector to take its original shape.

I claim:

1. A mirror for providing variable magnification, comprising a flexible reflector, a flexible diaphragm having inwardly directed channel means about its periphery, the periphery of said reflector being movably received in nonsealing engagement in said channel means whereby said diaphragm encloses the rear face of said reflector to provide an air pocket between said rear face and said diaphragm, a rigid support member connected to the diaphragm outwardly from the center thereof, and deflecting means connected between said rigid support member and said diaphragm for moving said diaphragm to position it with respect to said support member to change the volume of said air pocket, thereby causing a differential pressure between the front and rear faces of the reflector and causing said reflector to deform to form a seal between said reflector and channel means and to change its magnification.

2. The invention as set forth in claim 1 with the addition that said channel means comprises an inwardly directed lip extending over the peripheral edge of said reflector and a contact surface engaging the rear face of said reflector adjacent its periphery, expansible means are provided on said diaphragm joined to said contact surface, a central portion on said discharge is joined to the inward edges of said expansible means, said central portion being movable independently of said lip and contact surface by virtue of said expansible means to change the volume of said air pocket.

3. The invention as set forth in claim 2 in which said central portion is provided with a rigid plate for stiffening said central portion to cause it to move as a planner member upon actuation of said deflecting means.

4. The invention as set forth in claim 1 in which said deflecting means comprises a stem extending through said support member and fixedly connected at one end to the diaphragm, a cam rotatably attached to the other end of said stem and adapted to bear against the outer surface of said support member to exert a force on said stem for controlling the positioning of said diaphragm.

5. The invention as set forth in claim 4 in which said cam is attached to the other end of said stem by a shaft fixed to the cam and rotatably mounted on the stem, said shaft extending outwardly from said stem and having an adjusting knob mounted thereon.

6. The invention as set forth in claim 4 in which said reflector and support member are circular shaped at their engagement with said diaphragm and said stem extends through the center of said circular support member, thereby causing the deflecting force resulting from said pressure differential, to be equal at any point equidistant from the center of said circular reflector.

UNITED STATES PATENT OFFICE
CERTIFICATE OF CORRECTION

Patent No. 3,610,738      Dated October 5, 1971

Inventor(s) Carl E. Bochmann

It is certified that error appears in the above-identified patent and that said Letters Patent are hereby corrected as shown below:

Column 4, line 2, "discharge" to --diaphragm--

Column 4, line 14 change "surface" to -- face--.

Signed and sealed this 28th day of March 1972.

(SEAL)
Attest:

EDWARD M. FLETCHER, JR.      ROBERT GOTTSCHALK
Attesting Officer               Commissioner of Patents